April 19, 1932.  W. E. SWERN  1,854,813
DROP SIDE TELESCOPIC DRUM
Original Filed Aug. 23, 1926
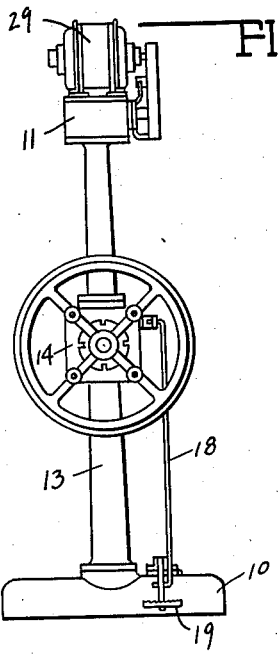
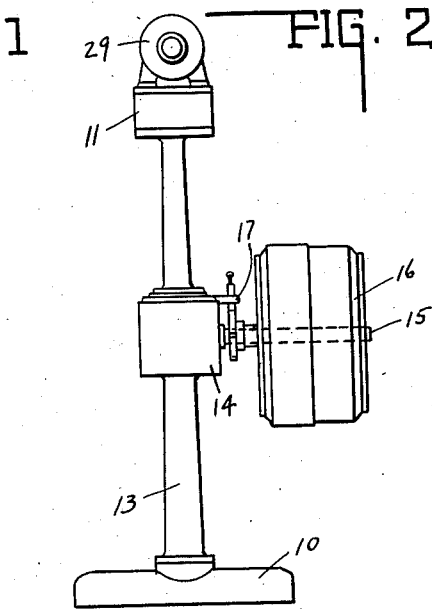
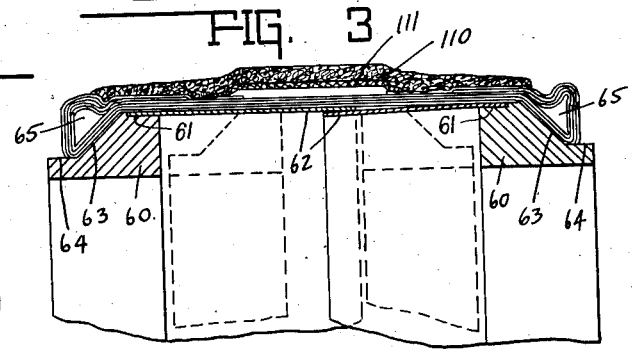
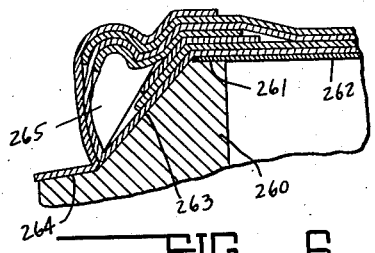
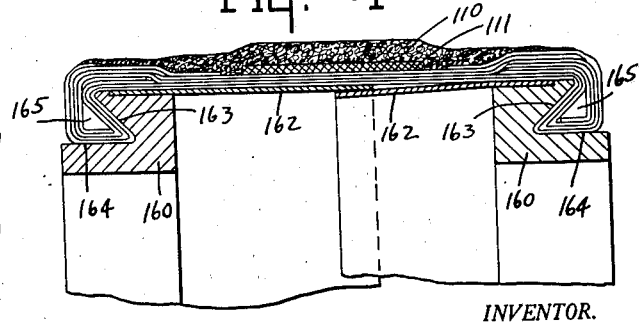
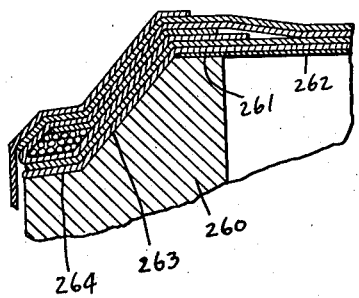
INVENTOR.
WILLIAM E. SWERN.
BY
ATTORNEYS.

Patented Apr. 19, 1932

1,854,813

UNITED STATES PATENT OFFICE

WILLIAM E. SWERN, OF KOKOMO, INDIANA, ASSIGNOR TO PAUL A. FRANK, OF AKRON, OHIO

DROP SIDE TELESCOPIC DRUM

Original application filed August 23, 1926, Serial No. 130,883. Patent No. 1,754,583, dated April 15, 1930. Divided and this application filed May 20, 1929. Serial No. 364,378.

The present invention relates to the manufacture of pneumatic tire casings or carcasses and while certain features of the invention may be used in the manufacture of tires by any of the well known or standard methods, the invention is particularly adapted and useful in the so-called "flat building" or drum methods of manufacture.

One of the objects of the invention is to provide a form or drum for the building of a tire which the central or body portion of the drum and the tire built thereon is flat or cylindrical, being provided with drop sides or reduced seats for the location of the beads or bead cores which form the beaded edges of the casings. The drop side construction permits the positioning of beads in the formation of a flat drum carcass below or within the cylindrical periphery of the carcass. Another object of the invention is to provide a certain range of adjustability in the width of the drum, or that portion thereof upon which the casing is built up, so that a single drum may be used for the manufacture of tires of varying cross sections but of the same bead diameter. While this result may be secured in other ways, the preferred method as shown herein is by forming the drum in a plurality of sections arranged to telescope together in securing the proper width between the bead seats.

Another object of the invention is to provide a drum which may be reduced in width to a sufficient extent to permit the finished carcass to be removed without collapsing the drum radially or making the same in sections. This beneficial result is particularly useful in the manufacture of the drop side form of tire casing, that is, the form of casing in which the beaded portions or edges of the tire are less in diameter than the central area of the casing. The formation of the drum is such that the tubular portions may be telescoped relative to each other for permitting the same drum to form different widths of tires having the same bead diameter or to permit the removal of a carcass formed thereon by additionally telescoping the drum and by angularly working the beads over the same for carcass removal. This construction, however, may be used to advantage in the manufacture of tires flat from edge to edge or in the manufacture of tires having arc-shaped central areas.

The present invention contemplates the production of drum type tire casings, either clincher or straight side, by a semi-flat drum showing the formation of the carcass upon the drum. The telescoped parts thereof are moved toward each other to permit removal of the carcass which is in cylindrical arrangement and this thereafter is suitably deformed and expanded and then cured in the deformed or expanded state, such expansion being obtained either mechanically or pneumatically and the curing occurring by any of the well known processes.

The invention is particularly designed for use in the tire building processes wherein the casing or carcass is removed while in the unvulcanized or uncured state, the tire being subsequently shaped and cured by the use of expanding devices and processes of various kinds. The subsequent shaping processes form no part of the present invention, and it is not necessary that they be described herein.

This invention is a division of my copending application Serial No. 130,883, filed August 23, 1926, which has matured into Pat. 1,754,583, issued April 15, 1930, entitled "Tire building machine," which is, as stated therein, a continuation in part of my likewise copending application Serial No. 723,353, filed June 30, 1924, which has matured into Pat. 1,741,208, issued Dec. 31, 1929, and entitled "Full drum type tire and process of forming same."

The feature of providing drop sides or reduced bead seats substantially as shown in Figures 3, 5 and 6 hereof is made the subject matter of copending application Serial No. 535,140, filed May 5, 1931, as a division of the present application.

The full nature of the invention will be understood from the accompanying drawings and the following description and claims.

Of the accompanying drawings,

Figure 1 is a front elevational view of a single unit drum;

Figure 2 is a side elevational view thereof;

Figure 3 is an enlarged central sectional view of a portion of tire carcass and the supporting drum showing the parts in expanded position, the dotted lines showing the parts in the telescoped or collapsed position for carcass removal, the tire illustrated being of the clincher type;

Figure 4 is a similar view of a drum and a straight side tire; and

Figures 5 and 6 are enlarged central sectional views of a portion of a modified drum with the carcass positioned thereon, the former figure illustrating a drum adapted for clincher type tires and the latter a drum for straight side type tires.

In the drawings 10 indicates a base and extending upwardly therefrom is a supporting standard 13. Projecting laterally from said standard is a support 14 for a drum spindle 15 mounting the drum 16. A suitable clutch is associated with the spindle and the drum is rotated through power means controlled by a link 18 and terminating in the foot lever 19. Lock 17 holds the shaft stationary for telescoping the drum through parts not shown so that the parts of the drum may be telescoped when the drum is rotated either by hand or by momentum previously acquired through shaft rotation.

The drum consists of a pair of annular members 60 provided with a peripheral face 61 recessed to receive a cylindrical member 62, the said cylindrical members being telescopically associated. In this way any width of drum surface can be obtained for any given diameter of bead. Of course different diameter drums may be substituted so that the same machine, by interchanging drums, is capable of forming carcasses for a complete line of tire sizes.

Each of the circular members 60 includes an inclined face 63, the faces being oppositely inclined to each other and being relieved or tapered as at 64. The drum is suitably supported upon the spindle 15 and is rotated thereby. The inclined face 63 and relieved portions 64 permit the bead 65 of the tire to lie substantially below the main body portion thereof when formed on the drum. This constitutes the drop side formation of the tire carcass.

The resultant adjustable drum construction permits any width of tire to be obtained for any given bead diameter and, as shown in the drawings, said tire may be of either the straight side or clincher type, Figure 3 illustrating the clincher type and Figure 4 the straight side type. In the last-mentioned figure, the parts are numbered with the 100 series, the inclined face being numbered 163, telescoping tubes 162, drum frame or edge 160 and the relieved face 164.

Figures 5 and 6 show substantially the same drum, the first being adapted for forming clincher type tires and the second for straight side tires. These drums differ from those shown in Figures 3 and 4 respectively by having a relieved face 264. The same parts are indicated by numerals of the 200 series, 262 indicating the tubular portions telescopically associated together, 260 indicating the frame members and 263 the inclined face.

In the manufacture of straight side tires the bead portion thereof is built in such a position that the rotation of the edge portion of the carcass about the bead in passing from the flat built condition to the shape of a tire casing is reduced to a minimum.

To remove the carcass of the tire from the drum the two sections of the drum are brought together, decreasing the overall width of the drum to such an extent that the tire may be removed by swinging one side of the tire over the collapsed drum, while the other side of the drum is forced into the central portion of the casing. In addition to the ease of operation as referred to in the opening portion of the specification, the present invention permits the removal of the completed carcass without dividing the drum into sections or segments. This makes it possible to construct a drum with fewer operative parts and a drum which will have longer life and require less maintenance and repair.

What is claimed is:

1. A drum tire building machine including a pair of annular bead-receiving frame members, and tubular extensions carried by each and extending toward each other and telescopically associated together, said tubular extensions supporting the tire body-forming portions of the carcass.

2. A tire building drum comprising a shaft, a drum on the shaft, and a device for holding one of said elements while the other is rotated, said drum having a plurality of sections movable along the shaft in order to reduce the width thereof.

3. In combination, a drum having outwardly facing bead supporting rings at the edges of the drum, and thin cylindrical extensions secured to the rings and projecting toward one another to constitute the surface whereon the tire is to be built.

4. In combination a drum having outwardly facing bead supporting rings at the edges of the drum, and thin cylindrical extensions secured to the rings and projecting toward one another to constitute the surface whereon the tire is to be built, the extensions being adapted to telescope when the rings are at their inner positions.

5. A tire building form comprising a main body portion substantially flat in cross section, and reduced bead seating portions on the edges of the body portion, said body portion being divided and constructed to permit the bead seating portions to approach each other to a sufficient extent to allow the removal of the completed tire without radial collapsing of the form.

6. A tire building form having a main portion on which the central portion of the tire is constructed, and bead seating surfaces peripherally smaller than the main portion of the form, the said form being contractible in the direction of its axis sufficiently to permit removal of a tire built thereon.

7. A tire building form being composed of two continuous annular sections placed side by side to complete the form, said sections being adapted to be telescoped sufficiently to permit the removal of a carcass built thereon.

8. A tire building form divided into a plurality of sections along a plane transverse to the axis of the form, the sections being adapted to telescope sufficiently to permit removal of the carcass built thereon.

9. A tire building form divided into a plurality of sections along a plane transverse to the axis of the form, the sections being provided with reduced bead seats, and being adapted to be moved telescopically.

10. A drum for use in the building of tire casings, comprising outer rings having reduced bead seats found thereon, and continuous cylindrical sheet metal drum sections attached to the rings and arranged in facing relations, one of said sections being movable within the other section, to a sufficient extent to reduce the width of the drum and permit the tire to be removed therefrom.

11. A drum comprising a plurality of continuous, unbroken annular sections arranged upon a shaft, the sections being movable relatively to one another.

12. A tire building drum comprising a plurality of continuous, unbroken annular sections arranged upon a shaft, the outer edges of the sections being formed with reduced bead seats, the sections being movable to cause the bead seats to approach, thereby freeing the tire carcass from the drum and permitting its removal by swinging one side of the carcass over the drum.

13. A tire building machine having a drum, means for adjusting the width thereof and means for providing the drum with a substantially smooth continuous surface regardless of the relative adjustment of its width.

14. The combination with a tire building machine having a rotatable driven shaft and a chuck secured to the shaft, of a cylindrical drum mounted upon the chuck, said drum being composed of axially adjustable sections whereby to permit variations in the width of the drum, and means to provide the drum with a substantially smooth cylindrical surface when the sections are in their various positions of adjustment.

15. A tire building drum comprising a pair of oppositely disposed edge members each having a portion thereof forming a part of the outer periphery of the drum and inclined edge portions constituting a bead seat, and means for supporting said edge members and permitting relative adjustment thereof to vary the distance between the bead seats without changing the diameter of the outer periphery of the drum.

In witness whereof I have hereunto affixed my signature.

WILLIAM E. SWERN.